United States Patent
Laing

(10) Patent No.: US 6,713,918 B2
(45) Date of Patent: Mar. 30, 2004

(54) SPHERICAL BEARING FOR ELECTRICAL MACHINES WITH PERMANENT MAGNETIC ROTORS

(75) Inventor: Karsten A. Laing, La Jolla, CA (US)

(73) Assignees: Oliver Laing, Remseck (DE); Karsten Laing, Remseck (DE); Birger Laing, Remseck (DE)

( * ) Notice: Subject to any disclaimer, the term of this patent is extended or adjusted under 35 U.S.C. 154(b) by 0 days.

(21) Appl. No.: 10/151,808

(22) Filed: May 20, 2002

(65) Prior Publication Data
US 2003/0214192 A1 Nov. 20, 2003

(51) Int. Cl.$^7$ ................................................. H02K 7/08
(52) U.S. Cl. ..................... 310/90; 310/91; 310/266; 417/420
(58) Field of Search .................... 310/90, 266; 417/420

(56) References Cited

U.S. PATENT DOCUMENTS

| 3,803,432 A | * | 4/1974 | Laing | ........................... 310/90 |
| 4,658,166 A | | 4/1987 | Oudet | |
| 4,682,067 A | | 7/1987 | Oudet | |
| 4,866,323 A | | 9/1989 | Oudet et al. | |
| 5,481,151 A | * | 1/1996 | Stacy | ........................... 310/256 |
| 6,222,291 B1 | * | 4/2001 | Boutaghou | ........................... 310/90 |
| 6,307,291 B1 | * | 10/2001 | Iwaki | ........................... 310/90 |
| 6,315,452 B1 | * | 11/2001 | Titcomb | ........................... 384/14 |

FOREIGN PATENT DOCUMENTS

DE        45808        6/1887

OTHER PUBLICATIONS

Minimotor SA Product Design Web Page Mar. 2, 2002 Minimotro SA, Switzerland.
The New Quantum Leap in Motor Technology: "Ferrous Loss–Free".

* cited by examiner

Primary Examiner—Nicholas Ponomarenko
Assistant Examiner—Iraj A. Mohandesi
(74) Attorney, Agent, or Firm—Foley & Lardner

(57) ABSTRACT

In the motor assembly of a pump in which a magnetic rotor is balanced on a spherical bearing projecting into an axial cavity of said rotor assembly, the bearing surface inside the cavity is shaped and dimensioned to stabilize the rotor assembly in the presence of diverging magnetic forces generated by the permanent magnets forming the core of the rotor.

13 Claims, 1 Drawing Sheet

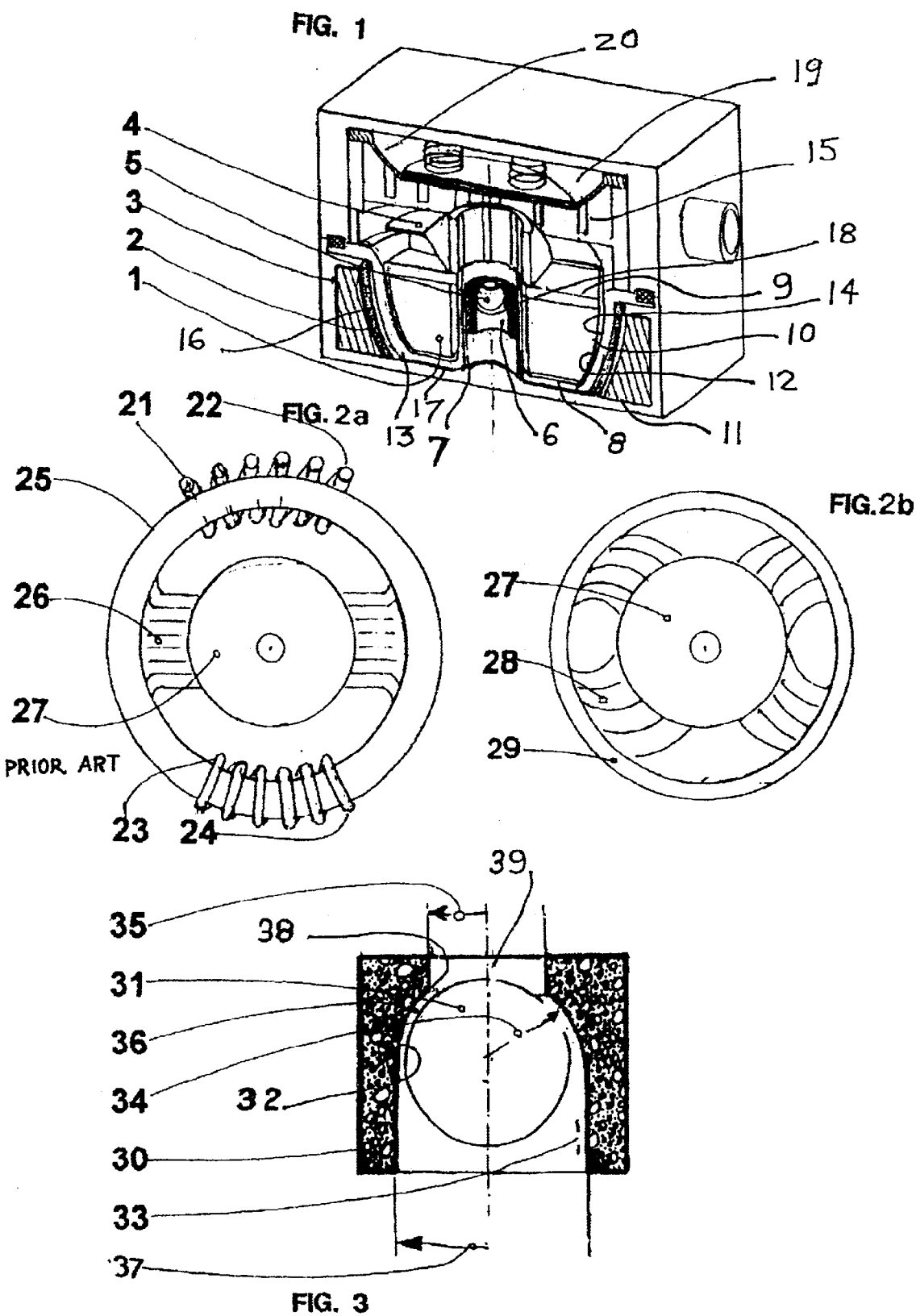

SPHERICAL BEARING FOR ELECTRICAL MACHINES WITH PERMANENT MAGNETIC ROTORS

FIELD OF THE INVENTION

This invention relates to rotating electrical machines in which the rotor comprise a permanent magnet, and more particularly to those motors in which the rotor is supported by a spherical bearing engaged into an axial cavity of the rotor.

BACKGROUND OF THE INVENTION

In an electrical machine wherein the rotor comprises a permanent magnet and a bearing cap pivotally supported by a magnetized rotor is a stationary bearing ball mounted on the tip of a pillar or post that is engaged into a cylindrical axial channel of the rotor, the bearing cap has a hole at its apex so that part of the pump fluid can leak through it to lubricate the bearing surfaces. The portion of the cap which is in contact with the ball, thus, defines a truncated hemispherical or frusto-spherical zone having at its top, the small diameter of the hole and at its base, a diameter closely matching the diameter of the ball so that small radially-directed forces can be absorbed. In prior art spherical motors where the permanent magnetic forces are generated by the stator winding, the magnetic lines of force run substantially parallel to each other across the air gap between the magnetic poles of the stator. These lines remain parallel even when the rotor moves eccentrically. The parallel magnetic forces have no tendency to increase the eccentric deviation of the rotor. However, in motors in which the rotor is formed by a strong permanent magnet, the magnetic lines of force across the air gap between the rotor and the stator follow divergent paths. If the rotor has a slight eccentricity, the magnetic pole which as moved closer to the stator is subject to increased magnetic forces while the opposite pole experiences a decrease in magnetic pull. This unbalance of forces exacerbates the deviation and tends to break the even and balanced contact between the bearing cap frusto-spherical zone and the ball. The axis of the bearing cap no longer matches that of the ball. The cap also tends to move axially away from the cap. A similar instability occurs in machines of the prior art every time the roto moves in such an axial way as may be caused, for instance, by a shock or other rapid acceleration.

This invention results from attempts to correct the aforesaid instability in machines with permanent magnet rotors.

SUMMARY OF THE INVENTION

The principal and secondary objects of this invention are to provide a rotor bearing configuration, in motors using a strongly magnetized rotor, that can withstand an even correct uniform bearing frictions due to slightly radially eccentric and axial movements of the rotor.

These and other valuable objects are achieved by providing a bearing surface for a single-ball bearing, or any other bearing structure having a hemispherical surface, that defines a cylindrical portion capped by a frusto-spherical sector whose radius is equal to the ball radius plus a desired clearance. An apical aperture having a radius of equal to approximately 60% of the ball radius allow lubricating fluid to reach the bearing surface.

BRIEF DESCRIPTION OF THE DRAWING

FIG. 1 is a cross-sectional view of an electrically driven pump assembly having a spherical motor with a permanent magnetic rotor;

FIG. 2a is a diagrammatical illustration of the magnetic forces of a field-magnetized motor of the prior art;

FIG. 2b is a diagrammatical illustration of the magnetic field created by a permanent magnet rotor; and FIG. 3 is a cross-sectional view of a bearing according to the invention.

DESCRIPTION OF THE PREFERRED EMBODIMENT OF THE INVENTION

Referring now to the drawing, there is shown in FIG. 1, in a centrifugal pump, a motor assembly having a rotor 1 made of a strong permanent magnet, a winding 2 positioned between the rotor and a soft magnetic yoke 3. The yoke is preferably made of particles of ferro-magnetic material coated with a non-conductive substance, such as an oxide. The pump impeller 4 is secured to the rotor, and both units are supported by a single bearing ball 5. The ball is mounted at the tip of a post 6 engaged in an axial cylindrical channel 7 opening as a cavity in the lower axial end 8 of the rotor. The upper and opposite axial end of the rotor 1 mounts the impeller 4. The peripheral wall 10 of the rotor defines a frusto-spherical surface between the lower axial end and the upper axial end. It should be understood that this surface could be axially linear, in other words, define a frusto-conical surface. It could also define an axially non-linear surface such as a parabolic or other arcuate but non-spherical surface. The winding 2 and soft magnetic yoke 3 define an annular stator 11 whose inner surface 12 mirrors the outer face of the motor periphery 10. A watertight septum 13 having a frusto-spherical portion 14 extending into the air gap between the rotor and the stator, separates the area of the pump 15 inundated by the conveyed fluid from the area 16 below it occupied by the stator. The bearing mounting shaft 6 projects from the center of a flat portion 17 of the septum. The axial channel of the rotor is cylindrical and has a diameter larger than the diameter of the pillar and bearing ball except for the area constricted by the presence of the bearing cap 30 contacting the ball 5. A resiliently compressible air chamber 19 partially made from a flexible diaphragm 20 is used in the upper part of the pump housing to absorb volumetric change of the conveyed fluid resulting from temperature variations.

In a conventional motor of the prior art illustrated in FIG. 2a, the magnetic field is created by the coils 21–24 of windings positioned around a ring stator 25. The magnetic forces 26 tend to run almost parallel to one another toward the rotor 27.

In a pump motor such as the one above-described, where the field is generated by a strong permanent magnet forming the rotor 27, the magnet lines of force 28 that run between the rotor and the soft magnetic yoke 29 are not all parallel to one another but follow the divergent, arcuate paths as illustrated in FIG. 2b.

In case of a small eccentricity in the position of the rotor, at least one magnetic pole of the rotor moves close to the magnetic yoke 29 while the opposite magnetic pole moves away from it. This creates an unbalance in the axial magnetic forces applied to the rotor which exacerbates the unbalance. The effects of that unbalanced condition are eliminated by the geometry of the bearing cap according to the invention.

Such a bearing cap 30 inserted in the axial channel 7 and illustrated in FIG. 3, is shaped and dimensioned to rest against the surface of the bearing ball 31. The bearing surface of cap 32 defines a hemispherical sector capping at the end of a cylindrical portion 33 whose radius 37 is equal to the radius 34 of the ball plus any desired clearance 36. The apex 38 of the hemispherical bearing surface is defined by an axial bore hole 39 whose radius 35 is approximately equal to 60% of the ball radius 34. This bore hole allows some of the fluid conveyed by the pump to reach the ball and bearing surface 32 for lubrication purpose.

It should be understood that the bearing surface in contact with the ball can be defined by the wall geometric of a portion of the rotor axial channel rather than by a bearing cap insert. Similarly, the ball can be replaced by an hemispherical tip at the upper end of the post. These being obviously equivalent bearing structures.

While the preferred embodiments of the invention have been described, modifications can be made and other embodiments may be devised without departing from the spirit of the invention and the scope of the appended claims.

What is claimed is:

1. A rotating electrical machine which comprise:
    a rotor including a permanent magnet and having an tidal channel;
    a stator including a magnetic yoke end a winding;
    a post having a cap axially engaged into said channel;
    a bearing ball of a given radius, said ball being positioned on said cap;
    a portion of said channel comprising a cylindrical portion transitioning to a hemispherical bearing surface capping said portion, said cylindrical portion and bearing surface having a hemispherical equal to said given radius plus a desired clearance, said cylindrical portion thereby forming side walls in a nest of said axial channel;
    said ball being engaged into said portion and bearing against said hemispherical bearing surface.

2. The machine of claim 1, wherein said hemispherical bearing surface has an apical aperture of a radius approximately equal to 60% of said given radius.

3. The machine of claim 1, wherein said rotor assembly comprises:
    a plurality of radially oriented magnetic poles;
    an upper circular axial end surface of a given diameter;
    an opposite lower axial end surface of a smaller diameter than said given diameter, said lower end surface having said post engaged therefrom;
    a peripheral wail surface.

4. The machine of claim 3, wherein said peripheral wall surface is axially non-linear.

5. The machine of claim 4, wherein said peripheral wail surface is arcuate.

6. The machine of claim 5, wherein said peripheral wall surface defines a frusto-spherical sector.

7. The machine of claim 3, wherein said stator has an inner wall surface spaced apart from, and mirroring said peripheral wall surface and
    said winding is scoured to said inner wall surface.

8. The machine of claim 7, which further comprises a watertight septum having a first section extending between said winding and said rotor and abase section extending under maid lower end surface of said rotor assembly; and
    wherein said post projects from said base section into said axial channel.

9. The machine of claim 8, wherein said yoke comprises particles of ferro-magnetic material coated with an electrically non-conductive substance.

10. In the manufacture of an electric motor including a magnetized rotor surrounded by an annular stator comprising a magnetic yaks and a winding;
    wherein said rotor is balanced on a spherical bearing of a given radius, said bearing including a hemispherical surface positioned at the tip of amounting post engaged into an axial channel in said rotor, an improvement which comprises:
        shaping and dimensioning a bearing surface in a cavity for receiving said tip of said mounting post into a spherical sector and a cylindrical portion having a base radius equal to said given radius plus a desired clearance dimension, said cylindrical portion thereby forming side walls in a part of said axial channel.

11. The improvement of claim 10, wherein said hemispherical bearing surface is truncated wad has an apical aperture of a radius approximately equal to 60% of said given radius.

12. The machine of claim 1, wherein said bearing bail is substantially spherical.

13. The machine of claim 1, wherein said bearing ball is substantially hemispherical.

\* \* \* \* \*